(12) United States Patent  
Gillespie

(10) Patent No.: US 8,196,760 B1  
(45) Date of Patent: Jun. 12, 2012

(54) ADJUSTABLE DISPLAY MOUNT

(75) Inventor: John Michael Gillespie, Green Oaks, IL (US)

(73) Assignee: Peerless Industries, Inc., Aurora, IL (US)

( * ) Notice: Subject to any disclaimer, the term of this patent is extended or adjusted under 35 U.S.C. 154(b) by 574 days.

(21) Appl. No.: 12/336,287

(22) Filed: Dec. 16, 2008

(51) Int. Cl.
A47F 5/08 (2006.01)

(52) U.S. Cl. .................... 211/90.02; 211/90.01; 248/250

(58) Field of Classification Search ............... 248/309.1, 248/316.8, 235, 244, 250, 346.06, 346.07; 211/193, 90.01, 106.01, 175, 87.01, 204, 211/206, 88.01, 88.02, 90.02, 90.04, 26, 211/26.2, 187; 361/679.02, 679.04, 679.05, 361/679.06, 679.07, 679.08, 679.09, 679.21, 361/679.22, 679.27, 679.29

See application file for complete search history.

(56) References Cited

U.S. PATENT DOCUMENTS

| | | | |
|---|---|---|---|
| 3,724,798 A | | 4/1973 | Lucasey |
| 3,952,983 A | * | 4/1976 | Crochet ........................ 248/173 |
| 5,660,361 A | * | 8/1997 | Penger .......................... 248/131 |
| D392,976 S | | 3/1998 | Fenner et al. |
| 6,102,348 A | * | 8/2000 | O'Neill ..................... 248/289.11 |
| D472,556 S | | 4/2003 | Scharer et al. |
| 6,905,101 B1 | * | 6/2005 | Dittmer ...................... 248/274.1 |
| 7,246,731 B1 | * | 7/2007 | Matherne, Sr. ............... 224/403 |
| D558,562 S | | 1/2008 | Ciungan et al. |
| D562,113 S | | 2/2008 | Ciungan et al. |
| D568,323 S | | 5/2008 | Gillespie et al. |
| D580,742 S | | 11/2008 | Short |
| D581,915 S | | 12/2008 | Sculler et al. |
| D581,916 S | | 12/2008 | Sculler et al. |
| D593,104 S | | 5/2009 | Gillespie |
| 7,793,903 B2 | * | 9/2010 | Dittmer et al. ............. 248/276.1 |
| 2004/0164212 A1 | | 8/2004 | Gillespie et al. |
| 2005/0087661 A1 | * | 4/2005 | Rabenius ................... 248/309.1 |
| 2009/0308999 A1 | * | 12/2009 | Kim et al. .................. 248/299.1 |

OTHER PUBLICATIONS

"Lucasey Mounting Systems, FSF14 Dimensions, Flat Screen Furniture Mount," Lucasey Manufacturing Corporation, Oakland, California, 2005.
"Lucasey Mounting Systems, FSF14 Installation Instructions," Lucasey Manufacturing Corporation, Oakland, California, Nov. 24, 2004.
"Installation and Assembly—Display TV STB Enclosure, Model: MIS417" Peerless Industries, Inc., Melrose Park, Illinois, May 24, 2007.
"Installation and Assembly—Display TV STB Enclosure (Component Plate), Model: MIS417," Peerless Industries, Inc., Melrose Park, Illinois, May 30, 2007.
"Installation and Assembly—Display TV Mount, Model: MIS418," Peerless Industries, Inc. Melrose Park Illinois, May 24, 2007.

* cited by examiner

*Primary Examiner* — A. Joseph Wujciak, III
(74) *Attorney, Agent, or Firm* — Foley & Lardner LLP

(57) ABSTRACT

An adjustable mounting system for mounting a display on a fixture. First and second supports each include a bracket portion and a lateral arm portion. The bracket portion of the first support is operatively connectable to the fixture at a first location and the bracket portion of the second support is operatively connectable to the fixture at a second location. A cross support includes a first lateral adjustment arm, a second lateral adjustment arm, and an adapter arm. The first lateral adjustment arm is adjustably connected to the first lateral arm and the second lateral adjustment arm is adjustably connected to the second lateral arm. A display adapter is adjustably connected to the adapter arm and the display adapter includes an adapter support arm and an adapter bracket configured for operative connection to a display.

19 Claims, 5 Drawing Sheets

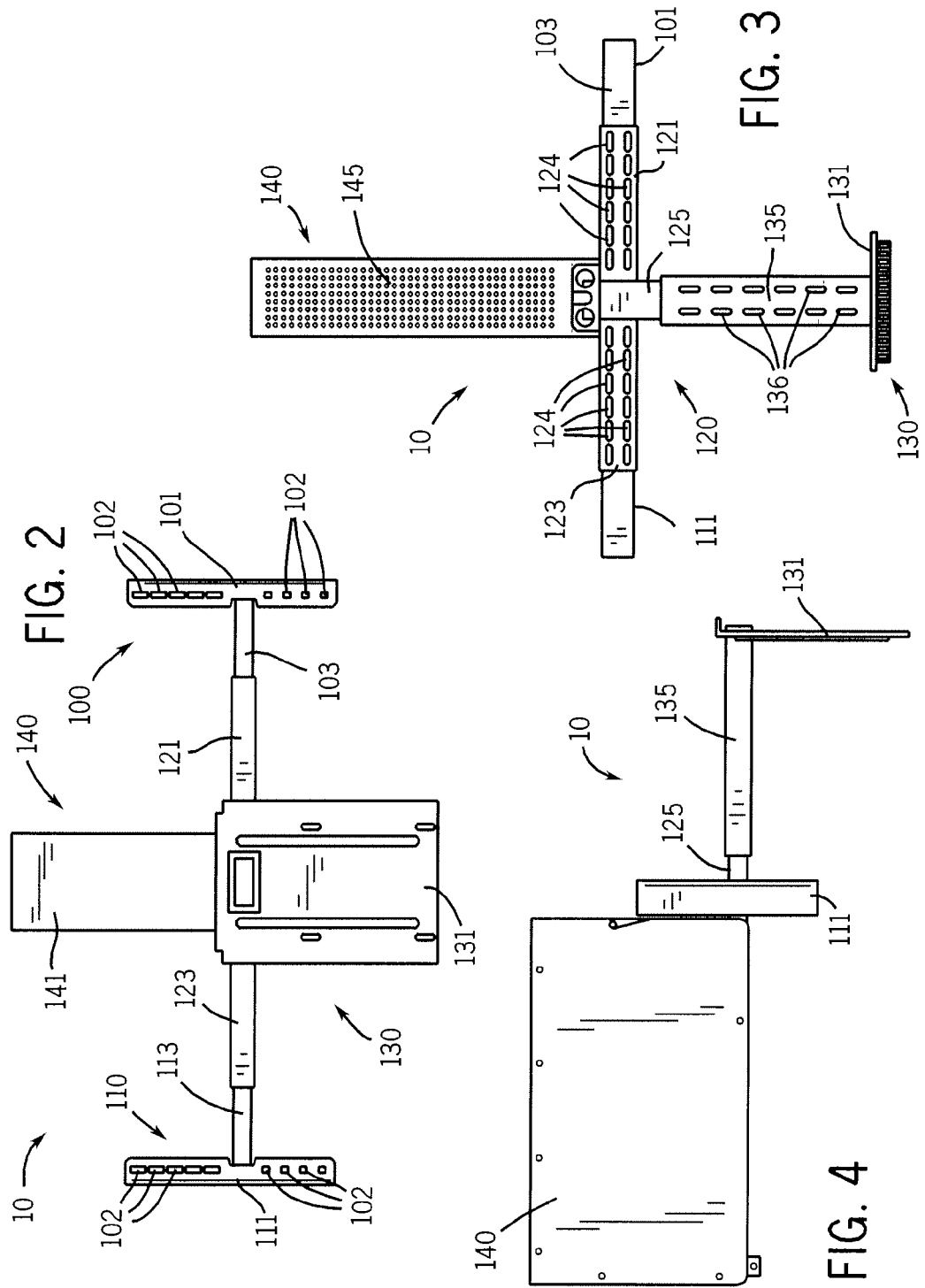

ADJUSTABLE DISPLAY MOUNT

FIELD OF THE INVENTION

The present invention relates generally to systems for mounting display devices. More particularly, the present invention relates to adjustable display mounting systems attachable to a fixture.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel display have become enormously popular in both commercial and residential sectors. As the prices for plasma and liquid crystal display ("LCD") flat panel displays have continued to fall, and the quality for the same devices have improved, more and more applications have arisen for these displays. Further, the small footprint and relative thinness of these displays has created a number of opportunities to use displays in industrial and commercial applications to convey information that may have previously only be displayed through static signage, if at all. Electronic displays positioned near various installations may be used to dynamically show varying messages and information. When used, for example, in a retail environment a display can not only present relevant product information, but when connected to a retail establishment's product information system, provide real time pricing and incentive messaging to potential consumers within the vicinity of the merchandise display.

SUMMARY OF THE INVENTION

Various embodiments of the present invention provide an adjustable mounting system for mounting a display device or other device to a fixture. Features of the mounting system are selectively adjustable and adaptable to readily permit the mounting system to couple to a range of fixtures of various configurations and sizes. The mounting system may be configured for attachment to a fixture such as a merchandise display in a retail environment, where the mounted display device may show information related to products that are arranged on or near the fixture. The adjustable mounting system is constructed such that, when it is attached to the fixture, it consumes a greatly reduced amount of space and presents reduced opportunities for interference with merchandise residing on the fixture. The adjustable mounting system may also support components associated with the display, including power supplies, a computer, or other display driving device. Further, the adjustable mounting system offers a clean appearance in an installation by providing internal routing of cables and power cords between the mounted display device and devices supported on the adjustable mounting system, the fixture, or external sources.

In one set of embodiments, an adjustable mounting system for mounting an display on a fixture, comprises a first support that includes a bracket portion and a lateral arm portion. The bracket portion of the first support is operatively connectable to the fixture at a first location on the fixture. The mounting system further comprises a second support including a bracket portion and a lateral arm portion, the bracket portion of the second support is operatively connectable to the fixture at a second location on the fixture. The adjustable mounting system further includes a cross support having a first lateral adjustment arm, a second lateral adjustment arm, and an adapter arm. The first lateral adjustment arm is adjustably connected to the lateral arm portion of the first support and the second lateral adjustment arm is adjustably connected to the lateral arm portion of the second support. A display adapter is adjustably connected to the adapter arm and the display adapter includes an adapter support arm and an adapter bracket that may be configured for operative connection to a display. The mounting system may further comprise a component support operatively connected to the cross support and disposed substantially opposite the display adapter.

In another set of embodiments, an adjustable mounting system for mounting a display on a fixture comprises a first support that includes a bracket portion, a lateral arm portion, and a display arm. The bracket portion of the first support is operatively connectable to the fixture at a first location on the fixture. A second support also includes a bracket portion and a lateral arm portion. The bracket portion of the second support is operatively connectable to the fixture at a second location on the fixture. The lateral arm portion of the second support is operatively connected to the lateral arm portion of the first support. A display adapter is adjustably connected to the adapter arm and the display adapter includes an adapter support arm and an adapter bracket that is configured for operative connection to a display.

These and other features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 2 is a front plan view of the mounting system of FIG. 1;

FIG. 3 is a top plan view of the mounting system of FIG. 1;

FIG. 4 is a side plan view of the mounting system of FIG. 1;

DETAILED DESCRIPTION OF VARIOUS EMBODIMENTS

Figure 1:
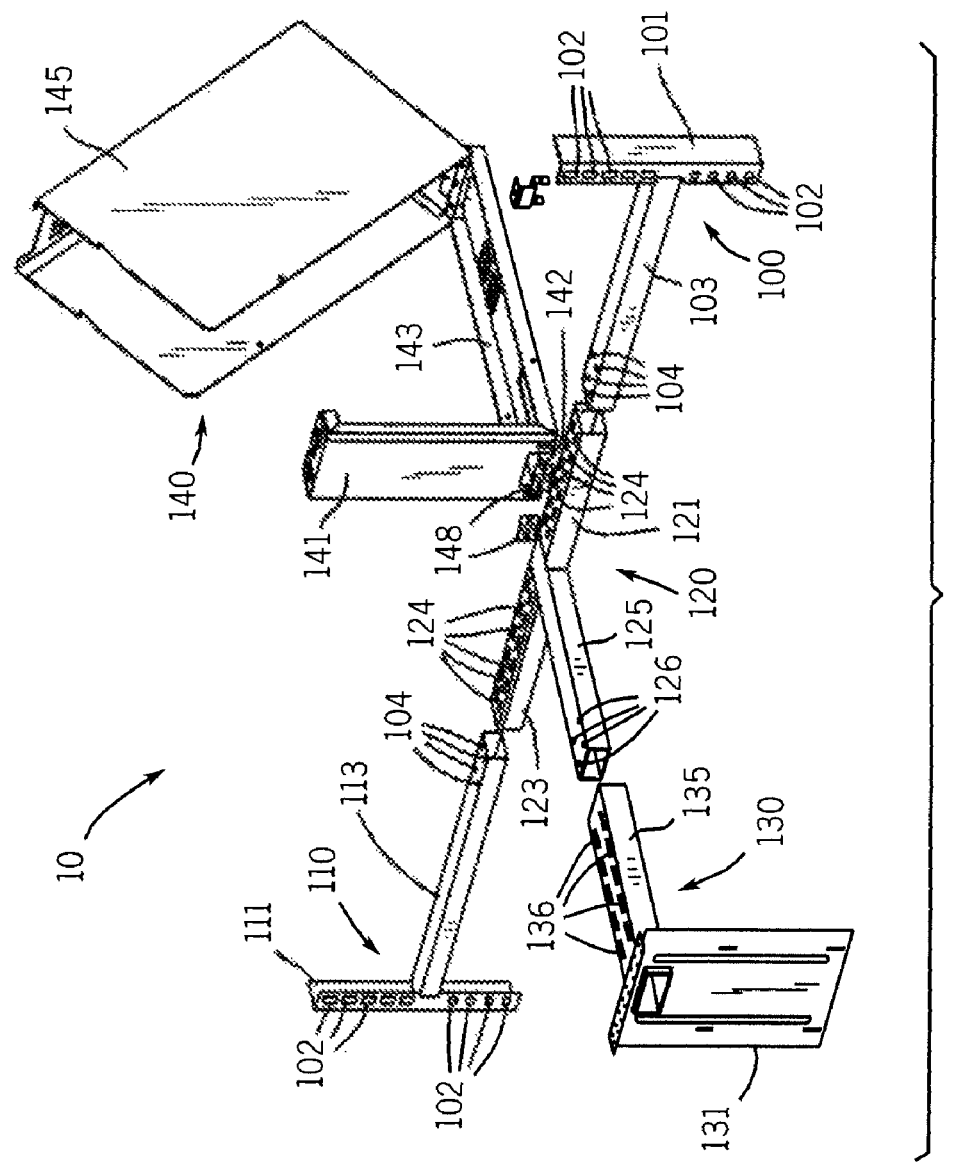
FIG. 1 is an exploded view of an embodiment of the mounting system of the present invention.

FIGS. 1-8 illustrate an adjustable mounting system 10 constructed in accordance with various embodiments of the present invention. The adjustable mounting system 10 comprises a first support 100 connectable to a fixture and operatively connected to a cross support 120, and a display adapter 130 operatively connected to the cross support 120. The adjustable mounting system 10 may further comprise a second support 110 connectable to the fixture and operatively connected to the cross support 120. The mounting system may still further comprise an equipment support 140 operatively coupled to the cross support 120.

Figure 6:
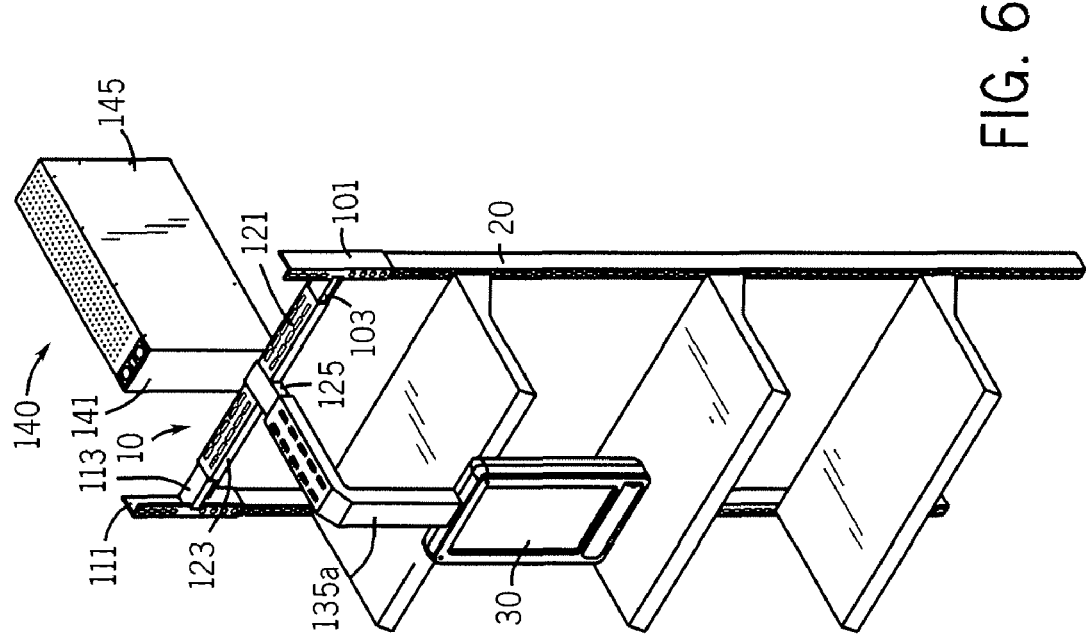
FIG. 6 is a perspective view of an additional embodiment of the mounting system attached to a fixture.
Figure 5:
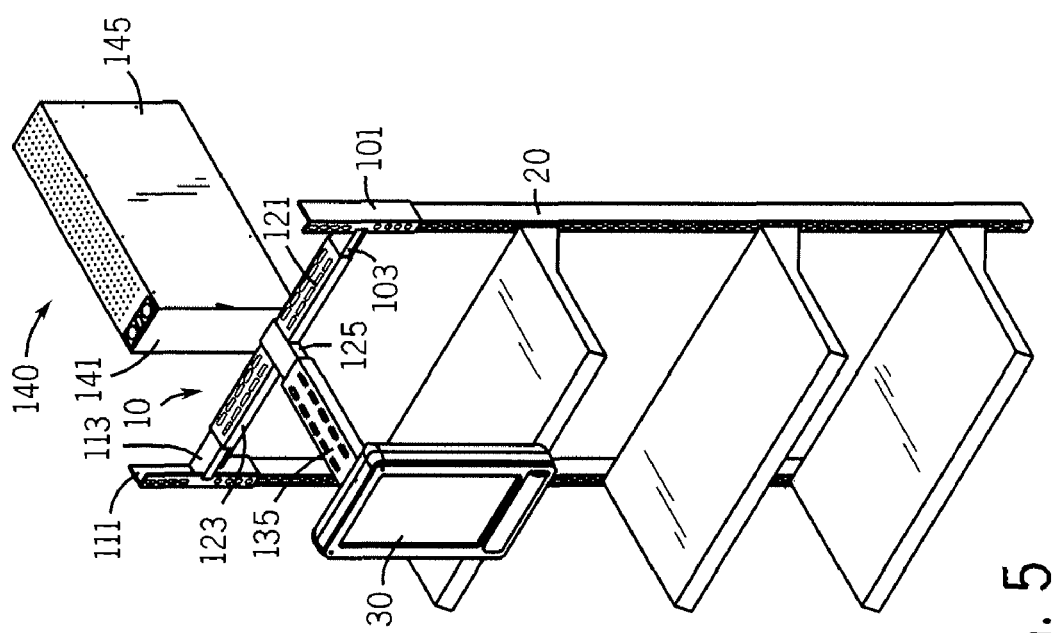
FIG. 5 is a perspective view of the mounting system of FIG. 1 attached to a fixture.
Figure 7:
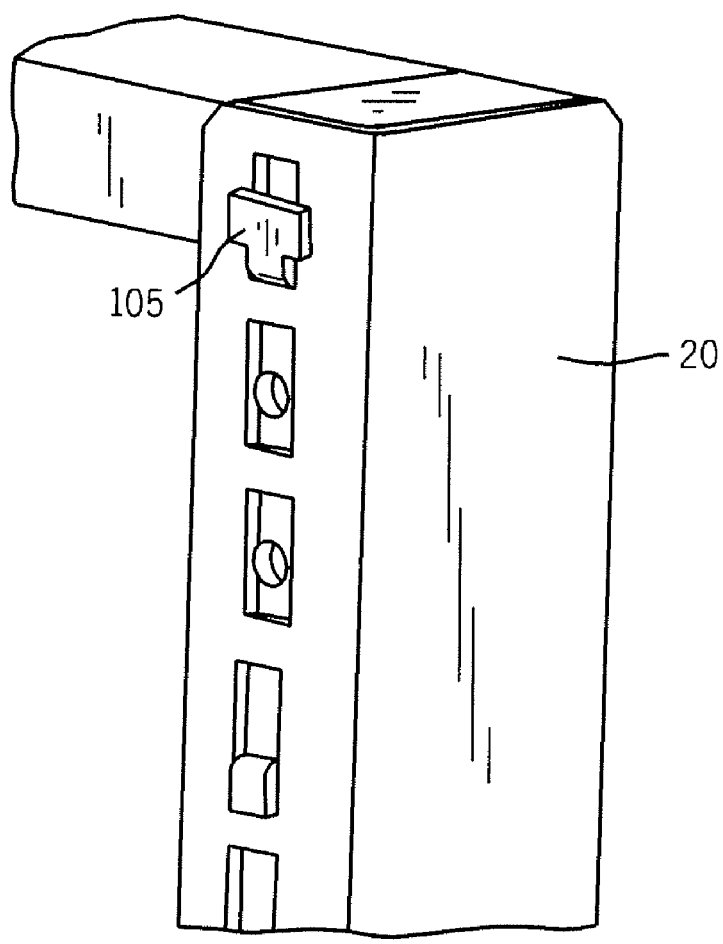
FIG. 7 is a detailed view of a portion of the fixture of FIGS. 5 and 6.

The first support 100 includes a first bracket 101 and a first lateral arm 103. The first bracket 101 is configured for attachment to a fixture 20 and may include a plurality of bracket openings 102 to receive one or more of a connecting element for connection with the fixture 20. The plurality of bracket openings 102 facilitate adjustment of the mounting system in 10 in relation to the fixture 20. As shown in FIGS. 5 and 6, for example, vertical adjustment of the adjustable mounting system 10 may be achieved by aligning the plurality of bracket openings 102 with the corresponding holes disposed over a length of a portion of the fixture 20. Alternatively, or in addition to the plurality of bracket openings 102, the first bracket 101 may be operatively connected to fixture 20 via a clamp or other connecting element. The orientation of the first bracket 101 and the fixture 20 may also be arranged to for horizontal adjustment of the adjustable mounting system 10. As illustrated in FIG. 7, a fixture bracket 105 adapted to receive the one or more connecting elements may be operatively connected to the fixture 20. The fixture bracket 105 may be used to couple the adjustable mounting system 10 to the fixture 20 where the fixture 20 cannot readily receive the one or more connecting elements and without modification of or clamping to the fixture 20.

The adjustable mounting system 10 may comprise a second support 110 operatively coupled to the fixture 20. As shown in FIG. 1, the second support 110 may be similar to the first support 100 and include a second bracket 111 and a second lateral arm 113. Like the first fixture bracket 101, the second bracket 111 may include a plurality of bracket openings 102 for use in connection to the fixture 20 and may also include a clamp or other connecting element such as fixture bracket 105 or combinations thereof. The second support 110 may be configured differently from the first support 100 as needed to operatively connect to the fixture 20. As depicted in FIG. 1, the first bracket 101 and the second bracket 111 may be "L" shaped to substantially correspond to a portion of the fixture 20 or an intermediate body. The first and second brackets 101 and 111 may also comprise alternative shapes, for example, a plate, "C" shape, cylindrical or rectangular hollow or solid tube, and combinations thereof. Additionally, the first and second brackets 101 and 111 may be configured to be at least partially received within a portion of the fixture 20.

The first lateral arm 103 and the second lateral arm 113 are operatively connected to the first and second brackets 101 and 111, respectively. As shown in FIG. 1, the first lateral arm 103 may extend substantially normal from the first bracket 101. The second lateral arm 113 likewise is orientated such that it extends substantially normal from the second bracket 111. The first lateral arm 103 and the second lateral arm 113 may be orientated such that they are substantially collinear as shown in FIG. 1. The first and second lateral arms 103 and 113 may comprise a solid or hollow member having, for example, a circular, rectangular, "L," or "C" cross-section. The first and second lateral arms 103 and 113 may be attached to the first and second brackets 101 and 111, respectively, by, for example, weld, connecting element, or formed from a single piece of material. The first and second lateral arms 103 and 113 may include an engagement feature to facilitate securement to the cross support 120. As shown in FIG. 1, a plurality of the lateral arm openings 104 are disposed on the first and second lateral arms 103 and 113 to afford engagement, in combination with connecting elements, with the cross support 120.

The cross support 120 may include a first lateral adjustment arm 121 and a adapter adjustment arm 125. The first lateral adjustment arm 121 is substantially collinear with the first lateral arm 103 and substantially normal to the adapter adjustment arm 125, forming a "L" arrangement. Where the adjustable mounting system 10 includes a second support 110, the cross support 120 may also include a second lateral adjustment arm 123 that may be substantially collinear with the first lateral adjustment arm 121, forming a "T" configuration, as shown in the depicted embodiment. The first lateral adjustment arm 121 is operatively connected to the first lateral arm 103. As shown in FIG. 1, the first lateral adjustment arm 121 is configured to at least partially receive the first lateral arm 103 in a nested configuration. Similarly, the second lateral adjustment arm 123 may also be configured to at least partially receive the second lateral arm 113. Alternatively, the first and second lateral arms 103 and 113 may at least partially receive the first and second lateral adjustment arms 121 and 123, respectively. As depicted, the first and second lateral adjustment arms 121 and 123 comprise hollow members with a rectangular cross-section to substantially correspond with the configuration of the first and second lateral arms 103 and 113. Other shapes may be used for the first and second lateral adjustment arms 121 and 123 and will generally substantially correspond with the shape of the first and second lateral arms 103 and 113.

In the depicted embodiments, the first and second lateral arms 103 and 113 are selectively nestable within the first and second lateral adjustment arms 121 and 123, respectively. A plurality of lateral adjustment arm openings 124 may be disposed over a length of the first and second lateral adjustment arms 121 and 123. As shown, the plurality of lateral adjustment arm openings 124 may comprise a plurality of slots. A plurality of lateral arm openings 104 may also be disposed along a length of the first and second lateral arms 103 and 113. One or more of the plurality of lateral arm openings 104 substantially align with one or more of the plurality of lateral adjustment arm openings 124 when, for example, the first lateral arm 103 is nested in relation to the first lateral adjustment arm 121. A connecting element may be received by one or more of the lateral arm openings 104 and the lateral adjustment arm openings 124 that are substantially aligned to secure the first lateral arm 103 in the desired position in relation to the first lateral adjustment arm 121. One or more of the first and second lateral arms 103 and 113 and/or the first and second lateral adjustment arms 121 and 123 may include locations to install and/or hang signage. In a retail environment, for example, the signage may display information relating to products displayed on the fixture 20.

As described above, the adjustable mounting system 10 may accommodate a variety of sizes of fixtures 20 through adjustment of the relative position between the first and second lateral arms 103 and 113 and the first and second lateral adjustment arms 121 and 123. As shown in FIGS. 5 and 6, accommodation for the width of the fixture 20 and the horizontal position of the display adapter 130 may accomplished in this way. For example, considering FIG. 2, the adapter bracket 131 may be adjustably shifted from side to side in a region between the first support 100 and the second support 110. In other configurations or orientations of the fixture 20, the adjustable mounting system 10 may adjusted to modify the height of the fixture 20 and vertical position of the display adapter 130, as described above.

As depicted in FIG. 1, the adapter adjustment arm 125 extends substantially normal from and in the same plane as the first and second lateral adjustment arms 121 and 123. However, in other embodiments, the display adjustment arm may extend at an elevation or angle in relation to the first and second lateral adjustment arms 121 and 123. The adapter adjustment arm 125 may be secured to the first and second lateral adjustment arms 121 and 123 by various techniques, including welding, connecting elements, or combinations thereof. The cross support 120 may also be formed from a single piece of material. As depicted, the adapter adjustment arm 125 comprises a hollow member with a substantially rectangular cross-section. Accordingly, as can be seen in FIGS. 3 and 4, an internal pathway is provided to route various cables between the equipment support 140 and the display adapter 130. As with the first and second lateral adjustment arms 121 and 123 and the first and second lateral arms 103 and 113, other shapes may be used for the adapter adjustment arm 125. The adapter adjustment arm 125 may be configured to be at least partially received in a portion of the display adapter 130. Alternately, the adapter adjustment arm 125 may receive at least a portion of the display adapter 130. A plurality of adapter adjustment arm openings 126 may be disposed over a length of the adapter adjustment arm 125 to facilitate securement to the display adapter 130 at the desired relative to the fixture 20.

In another embodiment (not shown), the adapter adjustment arm 125 is operatively connected to the first lateral arm 103, and the first lateral arm 103 is operatively connected to the second lateral arm 113. Accordingly, the cross support 120 may be eliminated if desired and the adapter adjustment arm 125 may be affixed to the first lateral arm 103. Alternatively, the lateral position of the adapter adjustment arm 125 may be selectively adjustably over a length of the first lateral arm 103 and/or the second lateral arm 113.

The display adapter 130 includes a adapter bracket 131 and a adapter support arm 135 operatively connected to the adapter bracket 131. As shown in FIG. 1, the adapter bracket 131 may be orientated substantially normal to adapter support arm 135. The two members may be attached, for example, with connecting elements, weld, or formed from a single piece of material. Alternatively, a rotatable and/or pivoting connection may be used to allow rotation and/or pivoting of the adapter bracket 131 relative to the adapter support arm 135. As depicted in FIG. 6, the adapter support arm 135*a* may comprise a "L" shape. Using the adapter support arm 135*a*, the height of the adapter bracket 131 and the display 30 may be adjusted and the adjustable mounting system 10 can accommodate various heights of the fixture 20 while maintaining the display 30 at a desired elevation for viewing without substantially interfering with the merchandise display area of the fixture 20. The adapter bracket 131 comprises a substantially flat plate sized to accommodate the display 30, such as a flat panel display. A plurality of display bracket openings 132 may be disposed in the adapter bracket 131 to substantially correspond with engagement locations disposed on the display 30 for securement of the display 30 to the adapter bracket 131. The adapter bracket 131 may be configured to accommodate a particular type or model of the display 30 and may include contours and/or cutouts to accommodate cables coupled to the display 30.

As shown in FIG. 1, the adapter support arm 135 is operatively connected to the adapter adjustment arm 125. The adapter adjustment arm 125 may partially receive the adapter support arm 135 in a nested configuration. However, the nesting configuration of the respective members may be reversed, as described above. Further, the adapter adjustment arm 125 and the adapter support arm 135 may comprise alternative shapes but the members will generally embody complementary shapes to facilitate their operative connection. The relative depth of the mounted display relative to the fixture may be selectively manipulated by adjusting the degree of nesting or engagement between the adapter adjustment arm 125 and the adapter support arm 135. As shown, the adapter support arm 135 may comprise a hollow member to permit internal routing of electrical cables between a display 30 mounted on the adapter bracket 131 and the equipment support 140.

A plurality of adapter support arm openings 136 may be disposed over a length of the adapter support arm 135. In the depicted embodiment, the plurality of adapter support arm openings 136 comprise a plurality of slots. The plurality of adapter support arm openings 136 are arranged such than one or more holes substantially align with one or more of the plurality of adapter adjustment arm openings 126 when the adapter support arm 135 is received by the adapter adjustment arm 125. A connecting element may be received by one or more of the substantially aligned plurality of adapter adjustment arm openings 126 and adapter support arm openings 136 to secure the connection between the adapter support arm 135 and the adapter adjustment arm 125. The connection between the display adapter 130 and the cross support 120 may thus be selectively adjustable to permit depth adjustment of the adapter bracket 131 and the mounted display 30 relative to the fixture 20. Accordingly, the adjustable mounting system 10 is adjustable to accommodate various depths of the fixture 20.

Figure 8:
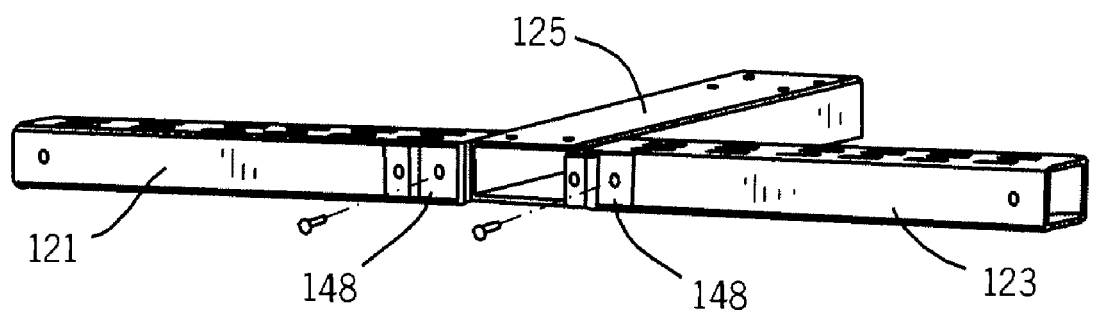
FIG. 8 is a perspective view of a portion of the mounting system of FIG. 1.

The adjustable mounting system 10 may further include an equipment support 140 that may be used to house various components that may be electrically coupled to the display 30. The equipment support 140 is operatively connected to the cross support 120. Connecting elements, for example, may be used to secure the equipment support 140 to the cross support 120. A horizontal support disposed beneath at least a portion of the equipment support 140 and operatively connected to the fixture 20 or the cross support 120 may also be used to further hold the equipment support 140. As shown in FIG. 8, one or more offset brackets 148 may be disposed between the cross support 120 and the equipment support 140 to laterally shift the equipment support 140 relative to the cross support 120 and provide additional clearance for materials placed on the fixture 20.

Figure 9:
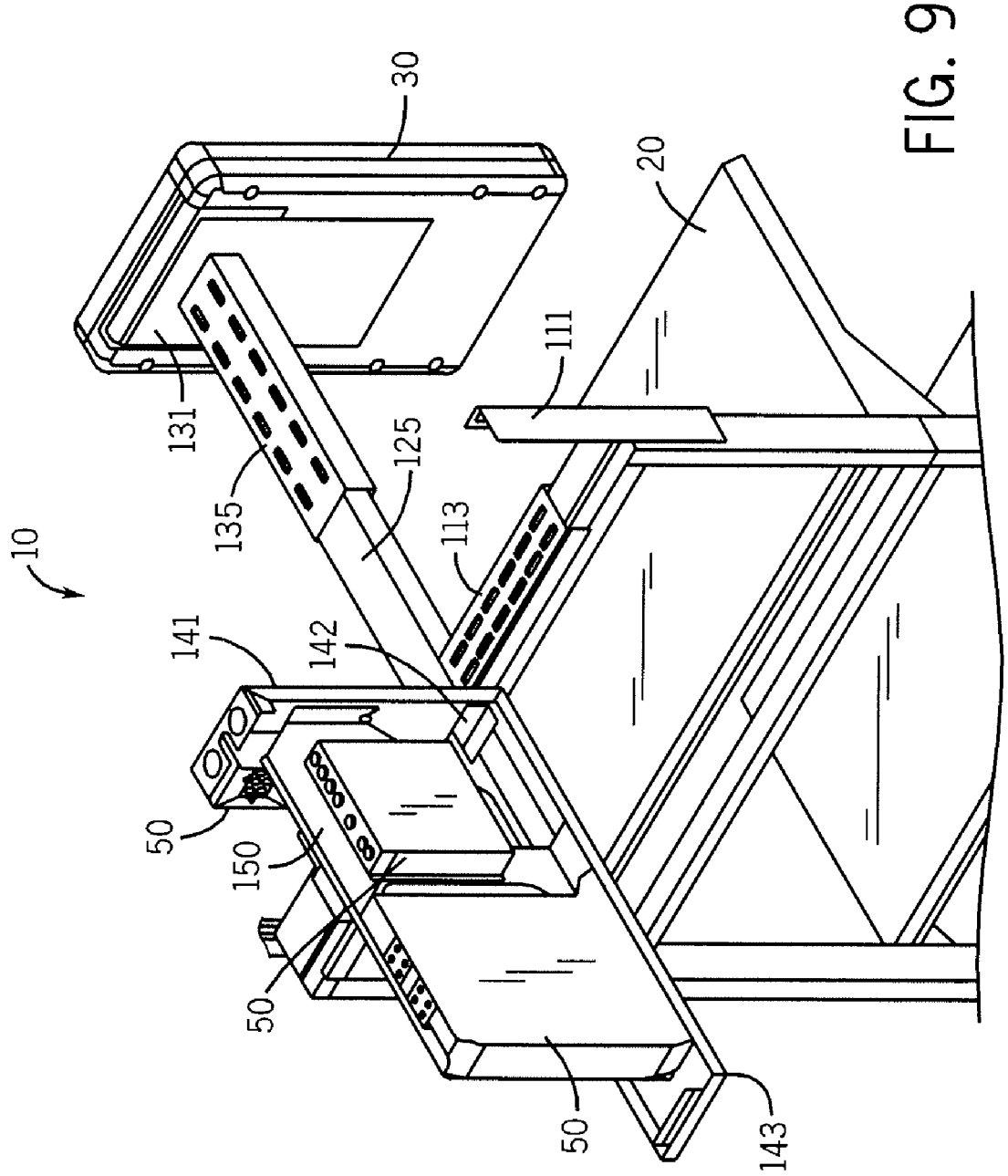
FIG. 9 is a perspective view of a portion of the mounting system of FIG. 1 shown attached to a fixture.

In the embodiment shown in FIG. 1, the equipment support 140 includes a front plate 141, a base 143, and a cover 145. The front plate 141 may include a hole 142 for the routing of cables from the equipment support 140 to the cross support 120. The adjustable mounting system 10 thereby provides a complete internal path for routing cables from the equipment support 140, through the cross support 120, through the display adapter 130 and to the display 30. The front plate 141 is operatively connected to the base 143. As shown in FIG. 1, the cover 145 may be hingedly secured to the base 143 to provide ease of access to an interior of the equipment support 140 and any components and/or cables residing therein. FIG. 9 depicts an optional component plate 150 that may be housed within the equipment support 140. Various components 50, for example, a computer, cable box, DVR, DVD player, one or more power supplies, etc, may be attached to the component plate 150. Use of the component plate 150 permits efficient maintenance and exchange of the components 50 used in conjunction with the display 30 and the adjustable mounting system 10 coupled to the fixture 20.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, modules and systems.

What is claimed is:

1. An adjustable mounting system mounting a flat panel display thereto and coupled to a fixture, comprising:
    a first support having a bracket portion and a first substantially horizontal arm portion, the bracket portion of the first support operatively connectable to the fixture at a first location;
    a second support having a bracket portion and a second substantially horizontal arm portion, the bracket portion of the second support operatively connectable to the fixture at a second location, the first and second locations being defined by different surfaces of the fixture;
    a cross support having a first substantially horizontal adjustment arm, a second substantially horizontal adjustment arm and an adapter arm, the first substantially horizontal adjustment arm adjustably coupled to the first substantially horizontal arm portion and the second substantially horizontal adjustment arm adjustably connected to the second substantially horizontal arm portion;
    a item adapter adjustably connected to the adapter arm, the item adapter including an adapter support arm and an adapter bracket configured for operative connection to the flat panel display; and
    a component support operatively connected to the cross support and disposed substantially opposite the item adapter.

2. The adjustable mounting system of claim 1, wherein the adapter arm and the adapter support arm define a substantially internal channel configured to receive one or more cables disposed between the component support and the flat panel display.

3. The adjustable mounting system of claim 1, wherein at least one of the first substantially horizontal arm portion, the second substantially horizontal arm, the cross support, and the adapter arm comprise one or more substantially hollow tubes.

4. The adjustable mounting system of claim 1, wherein the first location and the second location define a width of the fixture, and wherein the mounting system is adjustable to accommodate a plurality of widths for the fixture.

5. The adjustable mounting system of claim 4, wherein the first substantially horizontal adjustment arm is configured to partially receive the first substantially horizontal arm portion, and wherein the second substantially horizontal adjustment arm is configured to partially receive the second substantially horizontal arm portion.

6. The adjustable mounting system of claim 1, further comprising a component plate receivable by the component support, wherein one or more components may be operatively connected to the component plate.

7. The adjustable mounting system of claim 1, wherein the adapter support arm is configured to at least partially receive the adapter arm.

8. The adjustable mounting system of claim 1, wherein the first support and the second support are attachable to the fixture without modification to the fixture.

9. The adjustable mounting system of claim 1, further comprising the fixture, and wherein the fixture comprises a retail display unit for displaying merchandise.

10. The adjustable mounting system of claim 9, wherein at least one of the first support, the second support, and cross support include a feature for selective engagement of a sign.

11. An adjustable mounting system configured to mount an item thereto and also configured to be coupled to a retail display unit for displaying merchandise, comprising:
    a first support having a bracket portion and first substantially horizontal arm portion, the bracket portion of the first support operatively connectable to the retail display unit at a first location;
    a second support having a bracket portion and a second substantially horizontal arm portion, the bracket portion of the second support operatively connectable to the retail display unit at a second location, the first and second locations being defined by different surfaces of the retail display unit;
    a cross support having a first substantially horizontal adjustment arm, a second substantially horizontal adjustment arm and an adapter arm, the first substantially horizontal adjustment arm adjustably coupled to the first substantially horizontal arm portion and the second substantially horizontal adjustment arm adjustably connected to the second substantially horizontal arm portion;
    a item adapter adjustably connected to the adapter arm, the item adapter including an adapter support arm and an adapter bracket configured for operative connection to an item; and
    a component support operatively connected to the cross support and disposed substantially opposite the item adapter.

12. The adjustable mounting system of claim 11, wherein the adapter arm and the adapter support arm define a substantially internal channel configured to receive one or more cables disposed between the component support and the item.

13. The adjustable mounting system of claim 11, wherein at least one of the first substantially horizontal arm portion, the second substantially horizontal arm, the cross support, and the adapter arm comprise one or more substantially hollow tubes.

14. The adjustable mounting system of claim 11, wherein the first location and the second location define a width of the retail display unit, and wherein the mounting system is adjustable to accommodate a plurality of widths for the retail display unit.

15. The adjustable mounting system of claim 14, wherein the first lateral adjustment arm is configured to partially receive the first substantially horizontal arm portion, and wherein the second substantially horizontal adjustment arm is configured to partially receive the second substantially horizontal arm portion.

16. The adjustable mounting system of claim 11, further comprising a component plate receivable by the component support, wherein one or more components may be operatively connected to the component plate.

17. The adjustable mounting system of claim 11, wherein the adapter support arm is configured to at least partially receive the adapter arm.

18. The adjustable mounting system of claim 11, wherein the first support and the second support are attachable to the retail display unit without modification to the retail display unit.

19. The adjustable mounting system of claim 11, wherein at least one of the first support, the second support, and cross support include a feature for selective engagement of a sign.

* * * * *